United States Patent Office 2,754,171
Patented July 10, 1956

2,754,171

DYEING ORGANIC DERIVATIVE OF CELLULOSE MATERIALS

Victor S. Salvin, Irvington, N. J., assignor to Celanese Corporation of America, New York, N. Y., a corporation of Delaware No Drawing. Application May 8, 1951,
Serial No. 225,285

6 Claims. (Cl. 8—48)

This invention relates to the dyeing of organic derivative of cellulose materials and relates more particularly to an improved process for the dyeing of organic derivative of cellulose materials with azo dyestuffs produced in situ on said materials.

This application is a continuation-in-part of application S. No. 199,363, filed December 5, 1950, now Pat. No. 2,643,175.

An important object of this invention is to provide an improved process for the dyeing of organic derivative of cellulose materials with azo dyestuffs produced in situ on said materials.

Another object of this invention is to provide an improved process for the dyeing of organic derivative of cellulose materials in valuable blue shades with azo dyestuffs produced in situ on said materials.

Other objects of this invention will be apparent from the following detailed description and claims.

As is well known, it is possible to dye cellulosic materials, such as cotton and regenerated cellulose, with azo dyestuffs produced in situ on the said materials. According to this dyeing process, a diazotizable base or a coupling component is applied to the material to be dyed and the formation of the dyestuff is then caused to take place in situ on said material by immersing the same in suitable treating baths. A particularly valuable range of azo dyestuffs that are applied in this manner are the naphthol dyestuffs, so-called because the coupling component is an arylide of 2,3-hydroxynaphthoic acid. Although it has long been the practice to dye cellulosic materials in a wide range of valuable shades with azo dyestuffs that are applied in this manner, this process of dyeing has not been widely employed for the dyeing of organic derivative of cellulose materials, such as cellulose acetate. While it is possible to dye organic derivative of cellulose materials with selected naphthol dyestuffs produced in situ on the said materials in acceptable shades of yellow and red, the naphthol dyestuffs that produce blue shades on cellulosic materials yield non-reproducible violet and purplish shades on organic derivative of cellulose materials, which shades are not commercially acceptable. The lack of a complete range of acceptable shades has greatly limited the use of naphthol dyestuffs produced in situ in the dyeing of organic derivative of cellulose materials, although organic derivative of cellulose materials dyed with these dyestuffs possess many desirable properties, such as good wash fastness, resistance to gas-fading and the like.

In my co-pending application, referred to above, there is disclosed a novel process for dyeing organic derivative of cellulose materials in valuable blue shades with azo dyestuffs developed in situ on said materials, wherein the organic derivative of cellulose materials are treated either during or after the production of the dystuff thereon with a swelling agent such as, for example, diethylene glycol butyl ether, triethyl phosphate, tripropyl phosphate, the acetate of diethylene-glycol ethyl ether 2-methoxyethanol acetate, ethylene chlorhydrin, 2-butoxyethanol and hydroxyethyl acetate. The swelling agent alters the color of the dyed organic derivative of cellulose materials from shades of violet or purple to reproducible blue shades that are commercially acceptable.

I have now discovered that cellulose acetate and other organic derivative of cellulose materials may be dyed in valuable blue shades with azo dyestuffs, particularly naphthol dyestuffs, produced in situ on said materials, if there are present during the coupling of the dyestuffs certain non-ionic surface active agents. Thus, by adding to the bath employed for effecting the coupling of the dyestuffs from about 0.5 to 2% by volume, based on the volume of the bath, of certain non-ionic surface active agents, including the condensation product of an alkylolamine such as diethanolamine with a long chain fatty acid such as oleic, lauric, stearic and ricinoleic acid, sold as "Alrosol C" (a product produced by condensing 1 mole of capric acid and 2 moles of diethanolamine at elevated temperature with the elimination of water) and "Cerfak N–100"; "Softol 205" which is believed to be a condensation product of an amine and a fatty acid; polyoxyethylene sorbitol esters of long chain fatty acids such as polyoxyethylene sorbitol monolaurate, sold as "Atlas G 1020"; and long chain fatty acid esters of polyglycols, such as polyethyleneglycol monolaurate, sold as "Nonisol 100," there are obtained true blue shades instead of violet or purplish shades. The greatest improvement in shade is obtained where the surface active agent is the condensation product of an alkylolamine and a long chain fatty acid, although the other surface active agents indicated above also yield commercially acceptable blue shades. In addition to improving the shade of the dyed organic derivative of cellulose materials, the non-ionic surface active agents assist in removing from said materials any nitroso naphthols and other impurities that are formed during the dyeing process, so that the dyed organic derivative of cellulose materials exhibit a cleaner shade and are less likely to change in shade with the passage of time. Other non-ionic surface active agents, as well as anionic and cationic surface active agents, have little or no effect on the shade of the dyed cellulose acetate and other organic derivative of cellulose materials.

"Alrosol C" is 100% active, free flowing amber liquid having a specific gravity of 1.0, miscible with water in all proportions, soluble in most aromatic hydrocarbons but insoluble in aliphatic hydrocarbons and having good foaming properties. "Cerfak N–100" is a 100% active, water-soluble material which is stable to acids, alkalis and hard water. "Nonisol 100" is 100% active material, 2 to 3% soluble in water, 20 to 30% dispersible in water, insoluble in hot water, soluble in polar organic solvents such as alcohols, ethers, ketones and esters, and is slightly acidic and stable at a pH of 3.5 to 9.5. "Atlas G–1020," which comprises six moles of ethylene oxide per mole of sorbitol monolaurate, is entirely liquid and has a specific gravity at 25° C. of 1.1 and a viscosity at 25° C. of 1542 centipoises.

In carrying out the process of the present invention, the organic derivative of cellulose materials may have applied thereto a diazotizable base and a coupling component. The base may then be diazotized and coupling caused to take place by entering the organic derivative of cellulose materials into an alkaline developing bath containing one or a mixture of the non-ionic surface active agents set forth above. Following the production of the dyestuff, the dyed organic derivative of cellulose materials may be scoured, washed and dried, all in a manner well known in the art. Instead of effecting the steps of the dyeing process according to the foregoing sequence, the sequence of steps may be altered, for example, by including the coupling component in the alkaline developing bath, which alterations are known in the art. Examples of suitable diazotizable bases that may be employed in dyeing organic derivative of cellulose materials in accordance with this process include 4-benzoyl-amino-2-5diethoxy-aniline, 4-benzoyl-amino-2-5-dimethoxyaniline, and 6-benzoyl-amino-4-methoxy- meta-toluidin. Examples of suitable coupling components that may be employed with these bases include the anilide of Beta-oxy-naphthoic acid, the orthotoluidide of Beta-oxy-naphthoic acid, and the ortho-anisidine of Beta-oxy-naphthoic acid.

The process of the present invention may be employed for the dyeing of various organic derivative of cellulose materials, such as, for example, cellulose acetate, cellulose propionate, cellulose butyrate, cellulose acetate propionate, cellulose acetate butyrate and ethyl cellulose. The organic derivative of cellulose materials may be in the form of textile fabrics containing yarns of said materials, or they may be in the form of yarns or filaments. The articles being dyed may be made entirely of the organic derivative of cellulose materials, or they may be a mixture containing, for example, cotton, regenerated cellulose or wool in addition to the organic derivative of cellulose materials. By proper selection of dyestuffs various novel effects may be obtained with such mixtures.

The following examples are given to illustrate this invention further.

Example I

A fabric woven of cellulose acetate is immersed for 60 minutes in a bath maintained at 75° C. and containing 2% by weight on the fabric of 4-benzoylamino-2-5-diethoxy-aniline and 3% by weight on the fabric of the ortho-toluidide of Beta-oxy-naphthoic acid. The base is then diazotized by immersing the fabric for 30 minutes in a bath maintained at 25° C. and containing 2 grams per liter of sodium nitrite and 5 grams per liter of acetic acid. After being removed from the diazotizing bath, the fabric is rinsed and immersed for 60 minutes in an aqueous developing bath having a pH of 9, maintained at 75° C. and containing 1 gram per liter of soap and 1.5% by volume of Alrosol C. The fabric is dyed in a clear blue shade which is commercially acceptable.

When the Alrosol C is omitted from the developing bath, the dyed fabric exhibits a voilet shade which is not commercially acceptable.

Example II

A fabric woven of cellulose acetate yarns is dyed in the manner set forth in Example I, except that Softol 205 is substituted for the Alrosol C. The fabric is dyed in a good blue shade which is commercially acceptable.

Example III

A fabric woven of cellulose acetate yarns is dyed in the manner set forth in Example I, except that Atlas G 1020 is substituted for the Alrosol C. The fabric is dyed in a good blue shade which is commercially acceptable.

It is to be understood that the foregoing detailed description is given merely by way of illustration and that many variations may be made therein without departing from the spirit of my invention.

Having described my invention, what I desire to secure by Letters Patent is:

1. In a process for the dyeing of organic derivative of cellulose material, selected from the group consisting of cellulose esters and cellulose ethers, with naphthol dyestuffs yielding dyeings in blue shades on cellulosic material, wherein both a diazotizable amine and a coupling component are present in the fiber and said amine is diazotized in situ, the subsequent step of developing the true color of the dystuff in alkaline medium in the presence of a polyoxyethylene sorbitol ester of a long chain fatty acid.

2. A process as set forth in claim 1 in which said organic derivative of cellulose is cellulose acetate.

3. A process as set forth in claim 1 in which said subsequent step compromises the application to said fiber of a bath containing from about 0.5 to 2% by volume of said polyoxyethylene sorbitol ester of a long chain fatty acid.

4. Process as set forth in claim 1 in which said subsequent step comprises the application to said fiber of a bath containing soap and said polyoxyethylene sorbitol ester of a long chain fatty acid.

5. Process as set forth in claim 4 in which said bath contains about 0.5 to 2% by volume of said poly-oxyethylene sorbitol ester of a long chain fatty acid and said organic derivative of cellulose is cellulose acetate.

6. Process as set forth in claim 5 in which said coupling component is an arylide of 2,3-hydroxynaphthoic acid.

References Cited in the file of this patent

UNITED STATES PATENTS

| | | |
|---|---|---|
| 2,048,786 | Ellis | July 28, 1936 |

FOREIGN PATENTS

| | | |
|---|---|---|
| 380,851 | Great Britain | Sept. 12, 1932 |

OTHER REFERENCES

"Chem. Technology of Dyeing and Printing," by L. Diserens (Transl. by Wengraf and Baumann), Reinhold Pub. Corp., New York city, 1948, pp. 150 and 265.